Patented Feb. 9, 1937

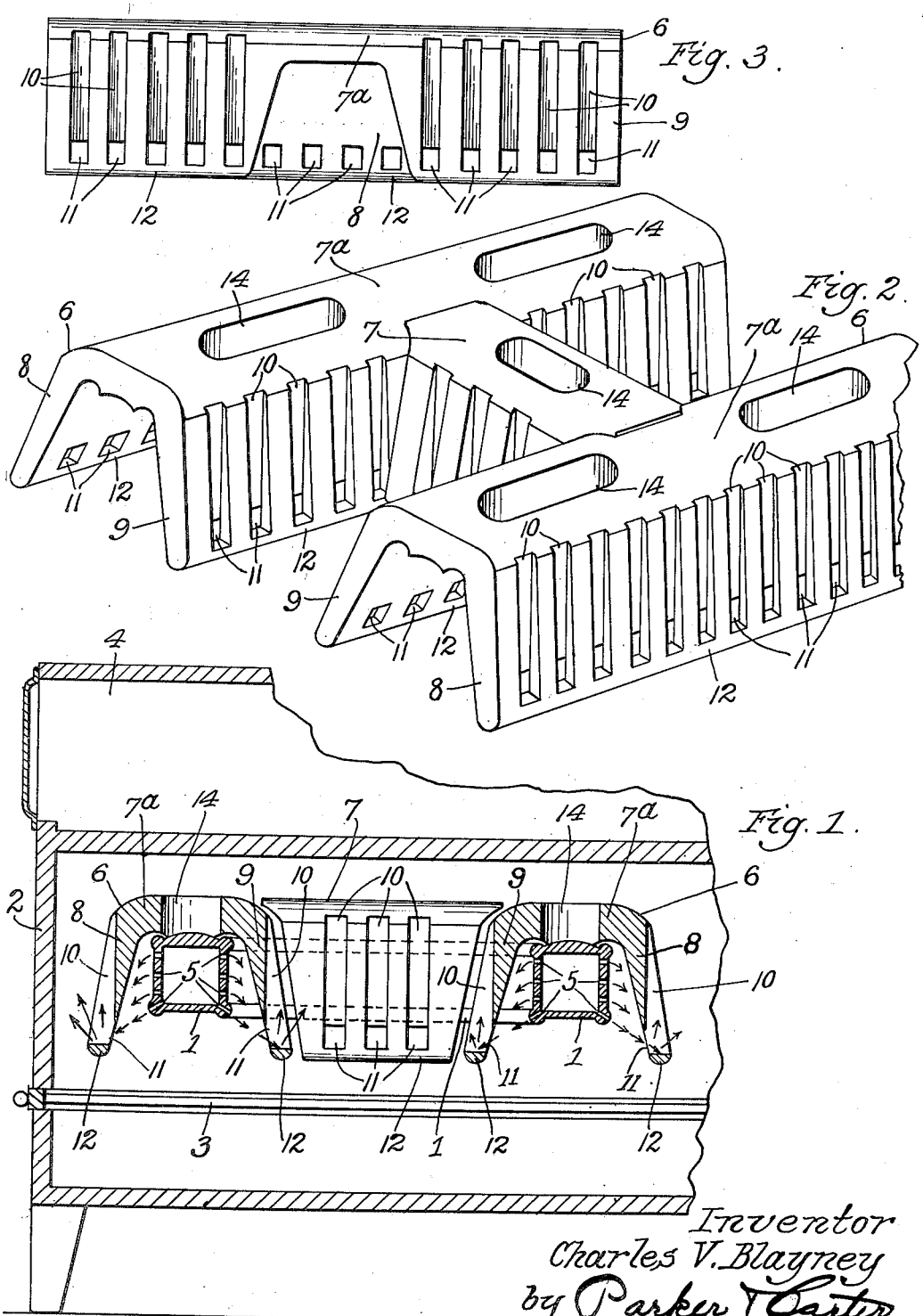

2,070,111

UNITED STATES PATENT OFFICE 2,070,111

BROILING DEVICE

Charles V. Blayney, Hinsdale, Ill.

Application February 23, 1934, Serial No. 712,455

3 Claims. (Cl. 158—99)

This invention relates to improvements in broiling devices and has for its object to provide a new and improved device of this description. The invention has as a further object to provide a new and improved broiling device wherein the efficiency of the device is increased and the food cooked on the broiler is more appetizing and has a finer flavor. The invention has as a further object to produce a broiling device which shall act more speedily and more effectively so as to give quicker service to the patrons. The invention has further objects which are more particularly pointed out in the accompanying description.

Referring now to the drawing, Fig. 1 is a view showing one form of the broiling device;

Fig. 2 is a perspective view showing one form of the heat radiant element used in connection with the burners;

Fig. 3 is a side view of one of the heat radiant elements.

Like numerals refer to like parts throughout the several figures.

Referring now to the drawing, I have shown one form of broiling device consisting of a series of burners 1 mounted within a suitable casing 2. Located below the burners is the broiling tray or member 3 upon which the meat to be broiled is placed. Located above the burners is an oven 4 to be used for any of the ordinary purposes.

I have illustrated in Fig. 1 the burners of the square burner type wherein the flames are projected from openings 5 in the burners. Mounted so as to cover the burners are the radiant elements 6 made of heat radiating material. In the construction shown there is a cross burner which is covered by the cross radiant element 7. These radiant elements are made of some suitable refractory material such as clay and are moulded of the proper size and shape.

The radiant elements 6 have the top wall 7a and the side walls 8 and 9 which extend downwardly along the sides of the burner and which are separated to form a space for the burner and which are provided with a series of grooves 10. These grooves extend along the exterior thereof and at their lower ends have the openings or passageways 11 which open into the interior of the radiant elements. At the bottom of each side wall is a member 12 which extends longitudinally therealong as shown. The members 12 prevent the partition members between the grooves 10 from breaking off, binding them together at the bottom in a unitary structure and increasing the strength of the device. This member 12 not only strengthens the device and facilitates its handling, but provides a flame directing member so that the flame from the burner passing outwardly and downwardly from the corners 5, as indicated by the arrow, will strike the flame directing member 12 and be diverted upwardly, as indicated by the arrows, so as to insure the quicker and more efficient and effective heating of the radiant element. The radiant element becomes red hot and radiates heat downwardly on the meat on the tray 3 and also radiates heat upwardly so as to heat the oven 10. Without these radiant elements either the oven or the broiling tray does not receive sufficient heat, but with these radiant elements both the oven and the broiler tray are properly and effectively heated and an efficient and satisfactory performance is secured. The upper walls of the radiant elements are preferably provided with openings 14 through which heat from the burners may pass.

The radiant elements 6, when used in connection with the cross radiant elements 7 have openings at the sides at the points where the cross radiant elements are located, as clearly shown in Fig. 3, so as to provide spaces for the cross burner over which the cross radiant element is placed.

I claim:

1. A radiant element for broiling devices comprising a top wall and two side walls of heat radiating material, the side walls separated by a space adapted to receive a burner, a plurality of grooves on the exterior of the side walls, said grooves at their bottoms extending entirely through the side walls so as to connect the interior space with the exterior thereof, flame directing elements extending along the bottom of said side walls and adapted to direct the flame upwardly along the exterior faces thereof when the device is in operation.

2. A radiant element for broiling devices comprising a top wall and two side walls of heat radiating material, the side walls being separated by a space adapted to receive a burner so that it directs its flames against the inner faces of said side walls, and means for directing the flames upwardly along the exterior of said side walls when the device is in operation.

3. A radiant element for broiling devices comprising a top wall and two side walls of heat radiating material, the side walls separated by a space adapted to receive a burner, a plurality of grooves on the exterior of the side walls, said grooves at their bottoms extending entirely through the side walls so as to connect the interior space with the exterior thereof, flame directing elements extending along the bottom of said side walls and adapted to direct the flame upwardly along the exterior faces thereof, said top wall being provided with openings through which heat may pass upwardly.

CHARLES V. BLAYNEY.